United States Patent [19]
Gear, Jr. et al.

[11] 3,961,127
[45] June 1, 1976

[54] UNIVERSAL POWER CABLE JOINT FOR USE WITH POWER CABLES HAVING VARIOUS INSULATIONS

[75] Inventors: Robert B. Gear, Jr., Hinsdale, Ill.; John C. Masepohl, Munster, Ind.

[73] Assignee: G & W Electric Specialty Company, Blue Island, Ill.

[22] Filed: June 11, 1975

[21] Appl. No.: 586,067

[52] U.S. Cl. .............................. 174/22 R; 174/71 R; 174/73 R
[51] Int. Cl.² ................. H02G 15/08; H02G 15/24
[58] Field of Search ............ 174/21 R, 22 R, 71 R, 174/73 R, 84 S, 88 R, 88 S; 339/242, 263 R, 272 R, 272 A

[56] References Cited
UNITED STATES PATENTS

| | | | |
|---|---|---|---|
| 3,597,527 | 8/1971 | Lusk | 174/73 R |
| 3,800,064 | 3/1974 | Lusk | 174/73 R |

*Primary Examiner*—Laramie E. Askin
*Attorney, Agent, or Firm*—Fitch, Even, Tabin & Luedeka

[57] ABSTRACT

A power cable joining device is disclosed for use in connecting or splicing two or more power cables wherein at least one of the power cables may comprise an impregnated paper insulated lead cable. The power cable splice in accordance with the present invention includes spacer element and gasket means which are cooperative with the prepared ends of the connected power cables in a manner to prevent migration of impregnate from the paper insulated power cable to the other connected power cables.

14 Claims, 5 Drawing Figures

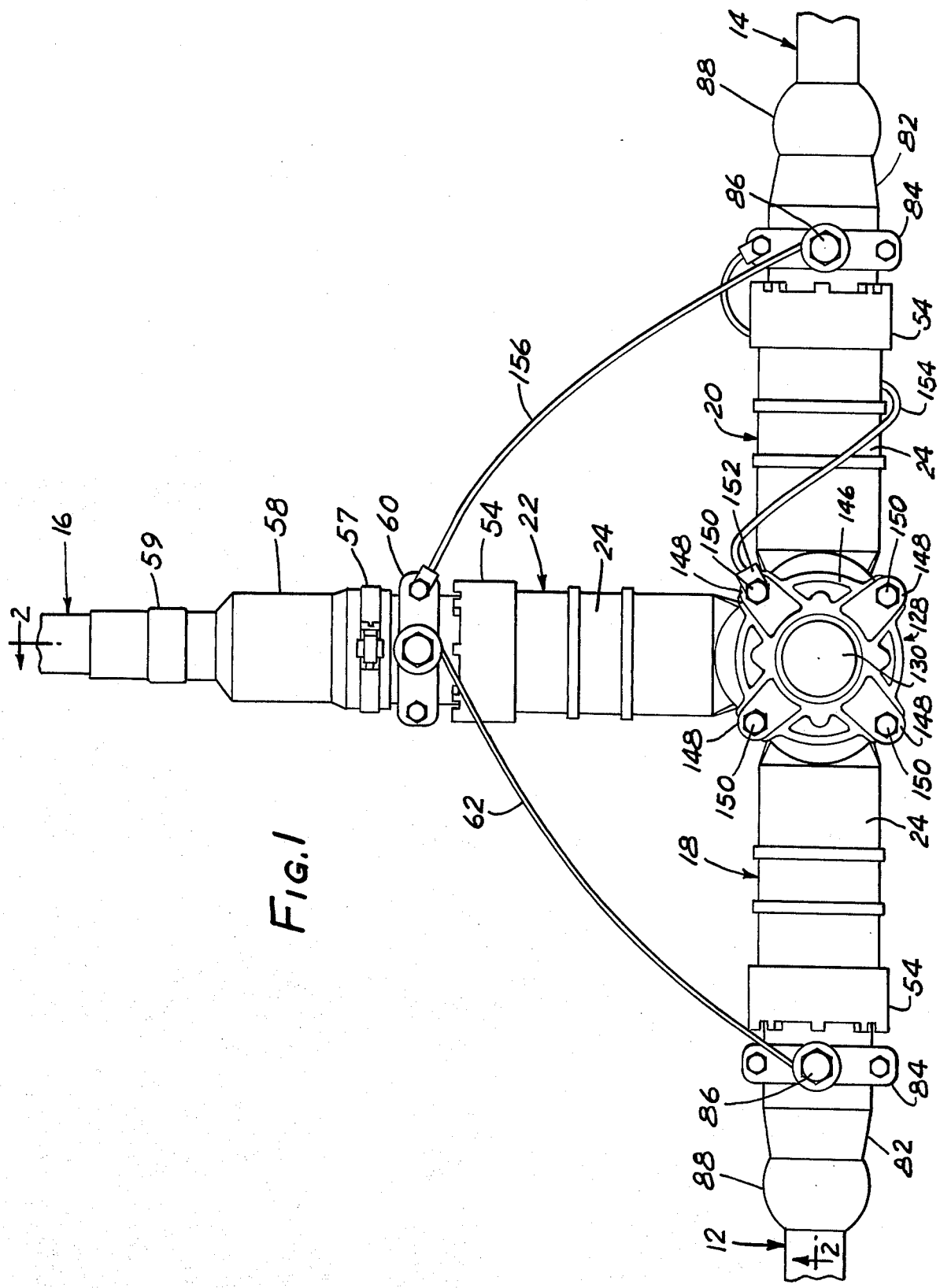

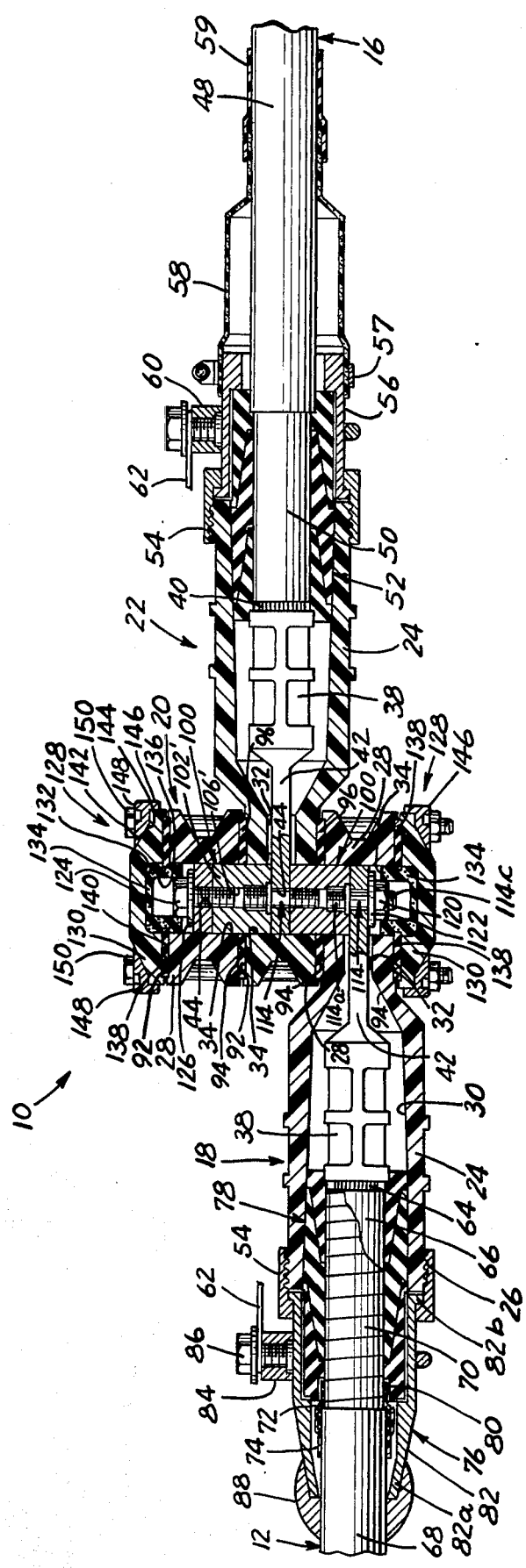

U.S. Patent   June 1, 1976   Sheet 3 of 3   3,961,127
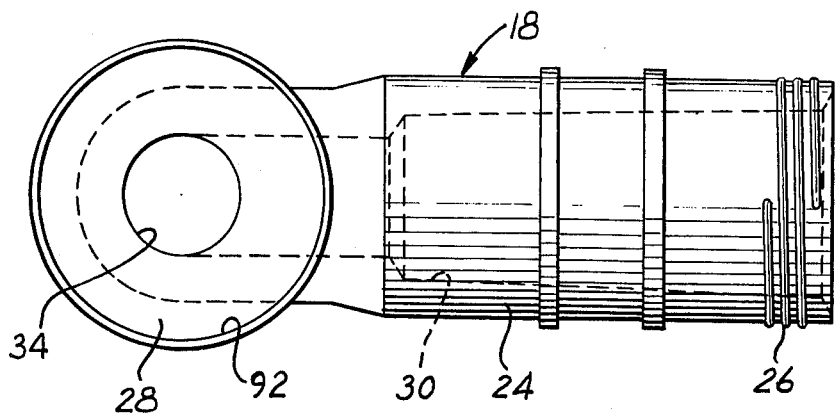
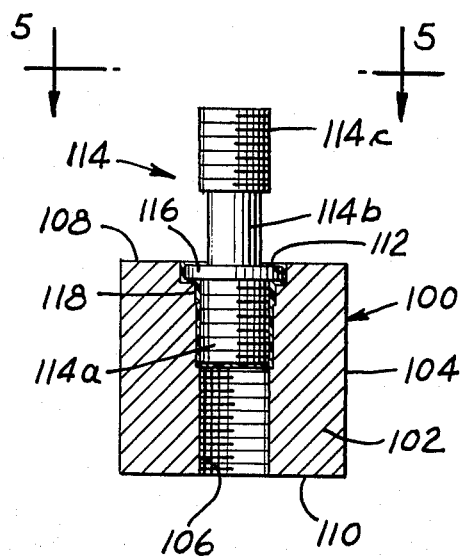
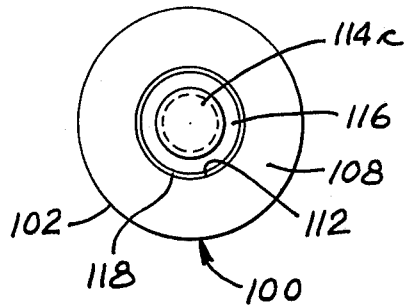

UNIVERSAL POWER CABLE JOINT FOR USE WITH POWER CABLES HAVING VARIOUS INSULATIONS

The present invention relates generally to power cables, and more particularly to a novel power cable joint or splice for connecting the prepared ends of two ormore power cables at least one of which may comprise an impregnated paper insulated lead covered power cable, the cable splice being adapted to prevent migration of the impregnate, such as oil, from the paper insulated power cable through the splice joint to the other connected power cables.

The cable splice in accordance with the present invention is substantially universal in that it may be employed to splice substantially all types of solid plastic or elastomeric insulated power cables and oil or other impregnated paper insulated lead covered power cables with relative ease in a field installation. Because circuit lengths often exceed the maximum length of a power cable that can be manufactured and pulled into place in one piece, provision must often be made for joining multiple segments or lengths of the cable. Typically, a manufactured segment of high voltage power cable ranges in maximum length between 1,000 to 2,500 feet, whereas complete high voltage cable circuits may extend for miles. Similarly, cable splice joints are desirable when replacing intermediate lengths or segments of a long cable, or when splicing one length of power cable to another existing installed length of power cable.

As used herein, the term "high voltage" refers to a rating of between approximately 15,000 and 35,000 volts (15–35 kv). Cables having such a voltage rating generally contain an electrically conductive layer (shielding) over the dielectric insulation layer. This shield layer generally consists of a carbon filled plastic or elastomer directly extruded over the insulation proper. Metal wires or tapes may be wound in a helical form concentrically around the cables on the shield system which is grounded.

The term cable "joint", as used herein, is interchangeable with the term cable "splice". A typical cable joint or splice involves the joining together of two or more power cables at one point such as may occur at an electrical switching device, circuit breaker, fuse box, transformer, or when tapping off an existing line intermediate its ends. Where three cables are joined at a common connecting point, the structure may take the form of a "wye" or a "tee" joint, depending upon the angular positions of the joined cables. In the joining of four cables at one point, the structure may take the form of a cross or "H" joint. The joining together of a plurality of power cables at one point may also take the form of an "in-line" splice. The cable joint or splice is the assemblage or connection of two or more power cables in one of these forms.

In preparing power cables for a splice connection to one or more other power cables, a portion of the conductor at the splice end of the power cable is exposed by removing lengths of both the insulation material and the shield layer. A further length of the shield layer is removed from a portion of the insulation so as to separate the exposed conductor and the grounded shield and thus provide adequate creepage distance from the live conductor to ground. A procedure for preparing an end of a power cable having a solid plastic or elastomeric insulation material is disclosed in U.S. Pat. No. 3,800,064, dated Mar. 26, 1974, and assigned to the assignee of the present invention. This referenced U.S. Patent also discloses a cable joint or splice which may be employed to interconnect two or more of the solid plastic or elastomeric type insulated power cables.

While the type of cable joint or splice disclosed in referenced U.S. Pat. No. 3,800,064 has proven highly successful in the splicing of solid plastic or elastomeric type insulated power cables, the cable joint or splice in accordance with the present invention facilitates splicing together of two or more power cables wherein at least one of the power cables may comprise a paper insulated lead covered type cable having an oil or other suitable impregnate in the paper insulation material. The splice prevents migration of the impregnate to other power cables in the splice connection.

Accordingly, one of the primary objects of the present invention is to provide a novel splice for use with power cables and the like, which splice facilitates connection or joining together of two or more power cables at least one of which may comprise a paper insulated lead covered type power cable having an impregnate in the paper insulation material, the splice in accordance with the present invention serving to prevent migration of the impregnate to other power cables in the splice connection.

Another object of the present invention is to provide a novel splice for connecting the prepared ends of two or more power cables, which splice facilitates splicing of paper insulated lead cables having oil impregnate with solid plastic or elastomeric insulation material in a manner to prevent migration of the oil impregnate from the paper insulation type power cables to the other power cables in the splice connection.

Another object of the present invention is to provide a splice joint as described which employs novel conductive spacer assemblies cooperative with gasket seals and splice housings to conductively interconnect prepared ends of power cables while preventing migration of impregnate between the spliced power cables.

A feature of the present invention is the provision of a novel power cable splice as described which facilitates substantially universal positioning of the various connected power cables within planes normal to the axis of the splice joint.

Further objects and advantages of the present invention, together with the organization and manner of operation thereof, will become apparent from the following detailed description of the invention when taken in connection with the accompanying drawings wherein like reference numerals designate like elements throughout the several views, and wherein:

FIG. 1 is a front elevational view of a power cable splice constructed in accordance with the present invention, the power cables being connected in a "tee" connection;

FIG. 2 is a longitudinal sectional view taken substantially along the line 2—2 of FIG. 1, looking in the direction of the arrows;

FIG. 3 is an elevational view of a splice housing as used in the splice connection of FIG. 1;

FIG. 4 is a longitudinal sectional view of a spacer assembly in accordance with the present invention; and FIG. 5 is an end view of the spacer assembly of FIG. 4, taken substantially along the line 5—5 of FIG. 4 and looking in the direction of the arrows.

Referring now to the drawings, and in particular to FIGS. 1 and 2, a power cable joining device, which may hereinafter be alternatively termed a power cable joint or power cable splice, is indicated generally at 10. In the illustrated embodiment, the power cable splice 10 is shown interconnecting the ends of three high voltage (15–35 kv) power cables, indicated generally at 12, 14 and 16, respectively, in a "tee" connection. The power cable splice 10 facilitates connection of the power cables 12, 14 and 16 in substantially any desired alternative connection to the illustrated "tee" connection, such as a "wye", an "H" connection, or with one or more power cables connected in an "in-line" splice, it being understood that a fewer or greater number of power cables may be employed in establishing alternative splice connections than shown in the illustrated embodiment. As will become more apparent hereinbelow, the power cable splice 10 allows substantially universal positioning of the associated power cables, 12, 14 and 16, rotationally about the axis of the splice, the term "universal" referring to selective movement of the power cables in planes normal to the axis of the splice connection.

The power cable splice 10 includes a plurality of splice housing, there being three splice housings indicated generally at 18, 20 and 22 in the illustrated embodiment. The splice housings 18, 20 and 22 are adapted to receive the power cables 12, 14 and 16, respectively. As will be described more fully below, each of the power cables 12, 14 and 16 has an end prepared for operative connection to its associated splice housing.

The power cable splice 10 is adapted to splice or conductively interconnect two or more power cables at least one of which may comprise a paper insulated lead covered cable having an oil or other suitable impregnate in its paper insulation material. The splice 10 is particularly adapted for splicing one or more such impregnated paper insulated lead cables to one or more other power cables of the solid plastic or elastomeric type. In the illustrated embodiment, the power cables 12 and 14 may comprise axially aligned portions of a paper insulated lead covered power cable as might be buried below ground level and which has been cut to facilitate splicing thereto of the solid plastic or elastomeric insulated power cable 16 of known design. The power cable splice 10 is adapted to connect impregnated insulation type insulated power cables, such as paper insulated lead covered or varnish cambric lead covered power cables, to power cables of the solid plastic or elastomeric insulated type in a manner to prevent migration of the impregnate from the paper insulated power cables to the other power cables in the splice connection. The migration of insulating cable oils may not seriously effect the solid elastomeric cable insulations, but the loss of impregnated oils from the paper insulated cables can drastically degrade the dielectric strength of the cable. Therefore, it is imperative to prevent the loss of insulating oils from the paper insulated cable.

The splice housing 22 and its associated elastomeric insulated type power cable 16 are generally similar to the housing 29 and associated power cable 27 as disclosed in detail in the aforereferenced U.S. Pat. No. 3,800,064, which is incorporated herein by reference. The universal power cable joint disclosed in U.S. Pat. No. 3,800,064 is generally similar to the power cable splice 10 of the present invention but finds particular application in splicing solid plastic or elastomeric insulated power cables, while the present invention is adapted to splice solid plastic or elastomeric insulated power cables to oil impregnated insulation type power cables.

The splice housings 18, 20 and 22 are substantially identical in configuration and each is made of a suitable dielectric grade plastic material such as an epoxy resin. Each of the splice housings 18, 20 and 22 includes a generally tubular barrel portion 24 which has an external thread portion 26 at its outer end and terminates at its inner connection end in a junction pad 28. As best seen in FIG. 3, the junction pads 28 have generally circular plan configurations. Each tubular barrel portion 24 defines an internal axial frustoconical bore 30 which is open at its outer end and terminates at its inner end in a restricted axial recess or opening 32 of generally rectangular cross sectional configuration formed within the associated junction pad 28. Each junction pad 28 has a transverse cylindrical bore 34 formed therethrough the axis of which coincides with the center of the circular junction pad. As will become more apparent hereinbelow, the splice housings 18, 20 and 22, as well as other splice housings that may be added to form the desired power cable splice connection, are assembled such that the transverse bores 34 are in axial alignment.

The end of the power cable 16 received within the splice housing 22 is prepared in a manner as disclosed in the referenced U.S. Pat. No. 3,800,064. Briefly a spade terminal 38 is applied to a bared portion of the conductor 40 of the power cable 16. The spade terminal 38 includes an axially forwardly extending spade portion 42 of suitable rectangular transverse configuration to facilitate insertion of the forward spade portion into the restricted opening or recess 32 formed in the junction pad end 28 of the splice housing 22. The spade portion 42 has a transverse bore 44 provided therethrough the axis of which coincides with the axis of the bore 34 in the splice housing 22 when the spade portion is fully inserted into the associated recess 32.

The power cable 16 has a shield layer 48 which surrounds a dielectric insulation 50 formed on and encasing the conductor 40 in a known manner. The shield layer 48 is stripped back from the underlying dielectric insulation 50 for a predetermined length of the power cable 16, and a stress relief element, such as a silicone sponge stress cone indicated generally at 52, is received over the insulation layer 50 prior to assembly of the spade terminal 38 onto the conductor 40. An annular castellated clamp 54, a silicon bronze cable entrance housing 56, and a conductive elastomeric sealing boot or sleeve 58 are assembled onto the power cable 16 as shown in FIG. 2 and provide means for connecting the terminal end of the power cable 16 to the splice housing. A suitable clamping band 57 secures the boot 58 onto the housing 56, and a moisture resistant tape 59, such as a polyvinylchloride tape, sealingly secures the other end of the boot 58 onto the adjacent peripheral area of the cable 16. A grounding wire clamp 60 and a grounding wire 62 are preferably provided to ground the power cable 16 and associated splice housing 22 in a conventional manner.

The power cables 12 and 14 and their respective connections to the splice housings 18 and 20 are substantially identical to each other but differ from the splice housing 22 and its assembly with the prepared end of the power cable 16 due to the fact that the power cables 12 and 14 are of the paper insulated lead covered type. The illustrated power cable 12, which also exemplifies power cable 14, includes a conventional conductor 64 which is bared adjacent the end to be spliced. The bared end portion of the conductor 64 has a spade terminal 38 conductively secured thereon. The power cables 12 and 14 each have a paper insulation layer 66 which directly overlies the conductor 64. The paper insulation 66 is conventionally applied as an impregnated paper tape type insulation which is wrapped about the length of the conductor 64. The paper insulation 66 is impregnated with a suitable impregnate material, such as oil, which when not shielded has a tendency to seep from the paper insulation material and migrate along the length of the associated conductor. A lead shield cover 68 surrounds and encases the oil impregnated paper insulation layer 66. A protective plastic jacket (not shown) may be provided on the lead shield layer 68 to further protect against the outside elements of nature.

In preparing the power cables 12 and 14 for connection to their respective splice housings 18 and 20, a portion of the lead shield layer 68 is stripped from each power cable to expose a length of the paper insulation 66. A portion of the paper insulation 66 is then removed from the conductor 64 to provide a bared conductor end portion to be received and secured within a spade terminal 38 in a known manner. A layer of tape 70, such as silicone tape, is then wrapped about the length of exposed paper insulation 66 from the end adjacent the conductor 64 rearwardly to the lead sheath 68. The silicone tape is preferably applied in two layers from a continuous length of the tape and is half-lapped upon itself as it is applied over the paper insulation 66.

After applying the tape 70 about the paper insulation layer 66, an annular semi-conductive adapter member 72 is slid over the silicone tape 70 such that a portion of the adapter overlies the tape and a portion overlies the lead sheath 68 as shown in FIG. 2. The adapter 72 may be made of an extruded semi-conductive epichlorohydrin elastomer. A polyvinylchloride tape 74 is then preferably wound on the portion of the adapter 72 overlying the lead shield 68 so as to maintain the adapter in fixed relation on the lead shield.

Following application of the adapter member 72 and PVC tape 74, a wiping body assembly, indicated generally at 76, and a stress relief element, indicated generally at 78, are assembled over the silicone tape portion and the adjacent end of the lead shield 68 as shown in FIG. 2. The stress relief element 78 comprises an oil resistant silicone sponge stress cone which is substantially identical to the above referenced stress relief element 52 and is described in greater detail in the above-referenced U.S. Pat. No. 3,800,064. The stress relief element 78 performs the same function with paper insulated type power cables as when used with solid plastic or elastomeric type insulated power cables such as power cable 16. It will be noted that the stress relief element 78 includes a counterbored recess 80 to receive the adjacent end of the semi-conductive adapter 72.

The wiping body assembly 76 includes a wiping sleeve 82 the outer end 82a of which is tapered toward the peripheral surface of the lead sheath 68. The forward or inner end of the wiping sleeve 82 is formed with an annular flange 82b which provides an abutment for cooperation with a castellated clamp 54. The clamps 54 provide means for securing the prepared ends of the power cables 12 and 14 within their respective splice housings 18 by threaded connection with the peripheral threads 26 formed on the splice housings. A grounding clamp 84 is secured on the wiping sleeve 82 associated with each of the power cables 12 and 14. The grounding clamp 84 on the power cable 12 has the end of grounding wire 62 opposite its connection to grounding clamp 60 secured to the clamp 84 by means of a screw 86.

The spade terminals 38 are secured onto the bare conductors 64 of the power cables 12 and 14 after assembly of the wiping body assemblies 76 and stress relief elements 78 thereon. A procedure for preparing the ends of the power cables 12 and 14 for connection to their respective splice housings 18 and 20 is described in greater detail in a publication identified as GWI 39-15 available from G & W Electric Specialty Company, Blue Island, Ill. The end preparations of the paper insulated lead covered power cables 12 and 14, as well as preparation of power cable 16, may be readily carried out at the site of a splicing assembly. In field assembly or preparation of the ends of the paper insulated lead covered power cables 12 and 14, a lead field wipe 88 is applied to the outer tapered end 82a of each wiping sleeve 82 to overlie and form a seal with the associated lead sheath 68 to prevent moisture from entering beneath the wiping sleeves 82.

With reference to FIG. 2, taken in conjunction with FIGS. 3–5, the present invention is particularly concerned with the manner of assembling the splice 10 to connect the power cables 12, 14 and 16 so as to prevent migration of oil or other impregnate from the paper insulated lead covered type power cables to the solid plastic or elastomeric type power cables. To this end, the junction pad portion 28 of each of the splice housings 18, 20 and 22 is provided with circular recesses 92 and 94 in its opposite planar parallel surfaces, the recesses 92 and 94 being concentric with the transverse bores 34 in the junction pads. During assembly of the splice housings 18, 20 and 22 and their associated spade terminals 38, an annular oil resistant silicone rubber gasket 96 is inserted within each of the recesses 92 and 94 as necessary to insure that one such silicone gasket 96 is interposed between each pair of adjacent junction pads 28. As will become apparent below, a gasket is also positioned in each of the recesses 92 and 94 in the outward non-opposed exposed surfaces of the junction pads 28 of the upper and lower splice housings 18 and 20.

A spacer assembly, indicated generally at 100, is received within the bores 34 of each two adjacent splice housing junction pads 28, there being two such spacer assemblies 100 employed in the "tee" splice connection illustrated in FIGS. 1 and 2. With particular reference to FIG. 4, each splicer assembly 100 includes a spacer block 102 having a right cylindrical outer peripheral surface 104 and a threaded axial bore 106. The spacer block 102 has end surfaces 108 and 110 which lie in parallel planes perpendicular to the axis of the threaded bore 106. A counterbore 112 is provided in one end surface, such as 108, of the spacer block 102, concentric with the threaded bore 106.

The spacer blocks 102 are made of Alstan plated high conductivity aluminum alloy or suitable copper. Each of the spacer blocks 102 has a stud shaft 114 sealingly secured thereto, each stud shaft 114 having a threaded end portion 114a, an intermediate shank 114b and an opposite threaded end portion 114c. An annular flange 116 is formed integral on each stud shaft 114 adjacent the intersection of the threaded end portion 114a with the intermediate shank 114b. Each stud shaft 114 is assembled onto its associated spacer block 102 such that the threaded end 114a is received within threaded bore 106 and the flange 116 is received within the associated counterbore 112. The threaded end portion 114a and the seating surface, i.e. the annular peripheral surface and the radial shoulder surface portion of the flange 116 adjacent the threaded end 114a, are coated with an epoxy adhesive, indicated at 118, as the threaded end portion 114a and flange 116 are assembled into the spacer block 102. The epoxy adhesive 118 may be formed by mixing five parts by weight of ARALDITE 509, available from Ciba-Geigy Company, with one part by weight of a suitable hardener. The stud end 114a is threaded into the spacer block 102 and tightened to a torque of 5 ft. lbs., the epoxy adhesive being thereafter allowed to cure at room temperature for approximately 16 hours. During this assembly, the end surfaces 108 and 110 and the portion of the threaded bore 106 which does not receive the end portion 114a of the stud 114 are maintained clean and free of the epoxy.

The outer cylindrical surfaces 104 of the spacer blocks 102 have diameters sufficient to be received within the bores 34 of the splice housings 18, 20 and 22 when in assembled relation therewith, there being sufficient clearance to allow thermal expansion of the spacer blocks during use. In a three cable splice as illustrated in FIG. 2, a first spacer assembly 100 is inserted into the bore 34 in the junction pad 28 of the lowermost splice housing 18 such that the stud shaft 114 is received through the bore 44 of the associated spade terminal portion 42 and the threaded end portion 114c extends below the spade terminal. A nut 120 and washer 122 are assembled onto the threaded end 114c of the stud shaft 114 and secured against the opposing surface of the spade terminal 38 by tightening the nut 120 to draw the surface 108 of the spacer block against the opposing surface of the spade terminal. The nut 120 is tightened sufficiently to effect the desired assembly without deforming the relatively soft material of the spacer block 102, a torque on the nut 120 of aproximately 35 ft. lbs. having been found sufficient.

With a spacer assembly 100 thus secured to the spade terminal 38 in the lowermost splice housing 18, a silicone rubber gasket 96 is positioned over the spacer block 102 so as to be received within the recess 92 in the splice housing 18. The annular gasket 96 has a central circular opening of a diameter slightly less than the diameter of the spacer block 102 so as to sealingly engage the outer surface 104 of the spacer block when positioned thereon. The junction pad 28 of the splice housing 22 is then assembled onto the spacer block 102 such that the spacer block is received within the bore 34 of the splice housing 22. At this point the spacer block, designated 102', of a second spacer assembly 100 is inserted into the bore 34 of the splice housing 22 and the threaded end portion 114c of the stud shaft 114 is threaded into the open ended bore 106 of the lower spacer block 102. The spacer block 102' is rotated to effect the threaded connection of the associated stud shaft 114 within the underlying aligned threaded bore 106 until the spacer block 102' firmly captures the spade terminal portion 42 in the splice housing 22 between the lower and upper spacer blocks 102 and 102', respectively. The spacer block 102' is rotated to effect a torque of approximately 35 ft. lbs. between the associated stud shaft 114 and the underlying spacer block 102.

After securing the spacer blocks 102 and 102' together with the spade terminal 38 in the splice housing 22 affixed therebetween, a gasket 96 is inserted over the upper spacer block 102' and into the upwardly facing recess 92 in splice housing 22. The splice housing 20 is then assembled onto the upwardly projecting spacer block 102' and moved downwardly such that the gasket 96 is received within the downwardly facing recess 94 in splice housing 20. A suitable screw 124 is then threaded into the open ended threaded bore, designated at 106', in the upper spacer block 102', with a washer 126 interposed between the head of screw 124 and the opposing surface of the spade terminal 38 within splice housing 20. The screw 124 is tightened sufficiently to maintain assembly of the spade terminal 42 with the spacer block 102' without damaging the spacer block, it having been found that torquing the screw 124 to 35 ft. lbs. is generally sufficient.

After assembling the splice housings 18, 20 and 22 by means of the spacer assemblies 100, nut 120 and screw 124, upper and lower identically shaped cap assemblies, indicated generally at 128, are assembled over the upper and lower splice housings 18 and 20 and are secured together to further retain the splice housings 18, 20 and 22 in their superimposed relationship. Each of the cap assemblies 128 includes a generally circular sealing cap insulator 130, as considered in FIG. 1, which has a central circular recess 132 formed therin. The sealing cap insulators 130 are made of a suitable epoxy resin material. The central recesses 132 in the sealing cap insulators 130 receive conductive elastomeric cap-shaped inserts 134 therein, the inserts being adhesively bonded to their associated cap insulators 130 by means of a suitable conductive sealant.

Each of the cap-shaped inserts 134 has a central recess 136 therein of sufficient size to be received over an associated one of the screw heads 124 when the cap assemblies 128 are assembled onto the superimposed splice housings 18, 20 and 22. An annular flat silicone rubber gasket 138 is received over the outwardly projecting portion of each cap-shaped insert 134 and has its inner periphery received within an annular groove in the outer peripheral surface of the associated cap-shaped insert 134 such that the gasket is received within and retained against a recessed surface 140 formed in the associated cap insulator 130.

Each of the sealing cap insulators 130 has an annular beveled surface 142 thereon against which abuts an inclined or beveled surface 144 formed within a retainer cap 146 made of silicon bronze. Each of the retainer caps 146 is adapted to be received over an associated one of the sealing cap insulators 130, as shown in FIGS. 1 and 2, and has four equidistantly circumferentially spaced pads 148 each of which has a suitable opening therethrough to receive a retainer bolt 150.

In assembling the cap assemblies 128 on opposite ends of the previously assembled superimposed housings 18, 20 and 22, the pads 148 of the retainer caps 146 are positioned in axial alignment and retainer bolts 150 are inserted therethrough so that nuts secured on the bolts retain the splice housings and associated cap assemblies in assembled relation. The bolts 150 are tightened sufficiently to compress both the gaskets 96 and the gaskets 138. In this manner, passage of fluid, such as oil impregnate, from or between the respective splice housings is prevented.

A grounding clamp bracket 152 is secured onto one of the bolts 150 and has a grounding wire 154 connected thereto, the opposite end of the grounding wire being connected to the grounding clamp 84 on power cable 14. A grounding wire 156 is connected between grounding clamp 84 on cable 14 and the grounding clamp 60 on cable 16.

Thus, in accordance with the present invention, it can be seen that a universal splice is provided which facilitates splicing together of two or more power cables in substantially any desired splice configuration, such as a "wye", a "tee", or an in-line splice connection. The splice connection 10 is particularly suited for splicing together a paper insulated lead covered type power cable having an oil or other impregnate with solid plastic or elastomeric power cables in a manner which preventsmigration of the impregnate in the paper insulated type power cables to the other power cables in the splice connection. As noted, it is imperative that the insulating oils from the paper insulated cables, such as 12 and 14, be retained within the respective cables so as to prevent degradation of their dielectric strengths. The universal cable splice 10 of the present invention attains these ends.

While one embodiment of the present invention has been illustrated and described, it will be obvious to those skilled in the art that changes and modifications may be made therein without departing from the invention in its broader aspects. Thus, while two spacer assemblies 100 have been illustrated in assembling three power cables in a splice connection or joint, it will be appreciated that more than three power cables may be similarly connected through an appropriate number of splice assemblies 100.

Various features of the invention are defined in the following claims.

What is claimed is:

1. A cable joining device for connecting the ends of a plurality of power cables at least one of which may comprise an impregnated insulation type power cable, comprising, in combination, a spade terminal adapted to be secured on a bared conductor end of each of said power cables, each of said spade terminals having a transverse bore therethrough, a tubular splice housing adapted for cooperation with each of said spade terminals, each tubular splice housing having a transverse bore therethrough and being adapted to receive its associated spade terminal therein in a manner to expose the transverse bore of said spade terminal through said transverse bore in said splice housing, an electrically conductive spacer block having opposite end surfaces receivable within the transverse bores of two splice housings positioned in adjacent relation with their said transverse bores in substantially axial alignment, means securing the exposed spade terminals within said axially aligned bores to said end surfaces of said spacer block in electrical conducting relation therewith, said securing means including a stud shaft sealingly secured within a longitudinal bore formed in said spacer block so as to extend substantially axially from one end surface thereof for receipt through the exposed transverse bore in the spade terminal within one of said adjacent splice housings, said securing means further including connector means mountable on the outer end of said stud shaft so as to secure said spade terminal against said one end surface of said spacer block, seal means disposed between said adjacent splice housings and sealingly engaging the periphery of said spacer block, and means for securing said adjacent splice housings in said adjacent relation with said sealing means therebetween in a manner to prevent migration of impregnate between said splice housings and their associated spade terminals.

2. A cable joining device as defined in claim 1 wherein said spacer block is generally cylindrical and defines an axis of rotation about which said splice housings may be rotated in planes normal to said axis of rotation.

3. A cable joining device as defined in claim 1 wherein each of said splice housings includes a junction pad portion having said transverse bore therethrough, said junction pad portions having oppositely facing parallel surfaces, said seal means being disposed between adjacent opposing surfaces of said junction pad portions of said two adjacent splice housings, said seal means having a central aperture therein which receives said spacer block therethrough in sealing engagement with the peripheral surface of said spacer block.

4. A cable joining device as defined in claim 3 wherein said means for securing said adjacent splice housings in said adjacent relation includes a pair of end caps positioned to sandwich said junction pad portions of said adjacent splice housings therebetween, means securing said end caps together to retain said adjacent splice housings in assembled relation with their said transverse bores in axial alignment, and additional seal means disposed between each of said end caps and the opposing junction pad surface of said splice housings in a manner to prevent migration of impregnate between either of said splice housings and its associated end cap.

5. A cable joining device as defined in claim 1 wherein said longitudinal bore in said spacer block comprises an axial threaded bore which intersects said opposite end surfaces of said spacer block, said stud shaft being sealingly threadedly secured within one end of said threaded bore, said securing means further including a threaded fastener received through the transverse bore of the exposed spade terminal within the other of said adjacent splice housings and threadedly secured within the other end of said threaded bore in a manner to retain said other of said spade terminals in contacting relation with said spacer block.

6. A cable joining device as defined in claim 5 wherein said spacer block is made of conductive aluminum or copper, and wherein said stud shaft is threadedly secured within said threaded bore at a torque of approximately 5 foot pounds.

7. A cable joining device as defined in claim 5 wherein said spacer block has a counterbore formed in said end thereof receiving said stud shaft, said counterbore being contiguous to said threaded bore, said stud shaft having an annular flange thereon received within said counterbore, and including an adhesive sealant interposed between the mating areas of said stud shaft and said spacer block.

8. A cable splice assembly connecting the prepared ends of a plurality of power cables each of which has a terminal connector secured to the terminal end of its conductor, each of said terminal connectors having a spade portion extending substantially in the axial direction of its associated power cable, said assembly comprising, in combination, a generally tubular connector housing adapted for cooperation with each of said terminal connectors, each connector housing receiving its associated terminal connector in coaxial relation therein, each of said connector housings including a junction pad having a transverse bore therethrough to expose the spade portion of the associated terminal connector, electrically conductive spacer block means having opposite ends received within the transverse bores of a pair of adjacent junction pads positioned to axially align said transverse bores therein, said spacer block means having opposite end surfaces in intimate contacting relation with the exposed spade portions within said transverse bores, said spacer block means having a bore extending longitudinally therethrough, a stud shaft sealingly secured within said bore in said spacer block means adjacent one end thereof, said stud shaft extending from said one end of said spacer block means, means securing said stud shaft to one of said exposed spade portions in said adjacent connector housings, connector means connecting the exposed spade portion in the other of said adjacent connector housings to said spacer block means, gasket seal means between opposed surfaces of said adjacent junction pads, and external clamping means affixing said adjacent junction pads and said interposed gasket seal means in superimposed relation, whereby any fluid which may be disposed within the connector housing of one of said adjacent power cables is precluded from migrating to the other of said adjacent power cables in said assembly.

9. In a cable splicing assembly for connecting at least two power cables each of which has a prepared end having an exposed conductor portion, an exposed dielectric insulation portion, and an exposed end of a shield layer, said dielectric insulation portion of at least one of said power cables comprising a fluid impregnated wrap, said splicing assembly including, in combination, a terminal connector applied to the exposed conductor portion of each of said cables, a splice housing secured on each of said cables and having a longitudinal bore receiving the associated terminal connector, each of said splice housings having a transverse bore therethrough to expose a portion of the associated terminal connector, each of said splice housings defining a junction pad at its end opposite the associated power cable, means securing said junction pads of said power cables in superimposed relation to form a splice joint with the transverse bores of said splice housings in axial alignment, gasket seal means interposed between said superimposed junction pads, and electrically conductive spacer means having opposite ends received within the axially aligned transverse bores of each pair of adjacent superimposed junction pads so as to be in electrical contact with the associated exposed terminal connectors; the improvement wherein said electrically conductive spacer means comprises an electrically conductive spacer block cooperative with each pair of superimposed junction pads, each spacer block having a substantially cylindrical configuration and having a bore extending longitudinally therethrough, stud shaft means sealingly secured within one end of the bore of each spacer block and connected to one of the associated exposed terminal connectors to maintain electrical contact between said associated terminal connector and said spacer block, and connector means secured within the other end of each spacer block bore and connecting the other of said associated exposed terminal connectors to said spacer block, said gasket seal means including a gasket seal sealingly engaging the peripheral surface of each spacer block such that migration of fluid impregnate from one of said power cables to the other is prevented.

10. The cable splicing assembly of claim 9 wherein said longitudinal bore in each of said spacer blocks is threaded, said stud shaft means comprising a stud shaft associated with each of said spacer blocks and having opposite threaded end portions, one threaded end portion of each stud shaft being sealingly secured within the threaded bore of an associated one of said spacer blocks, the other threaded end portion of each stud shaft being connected to its said associated exposed terminal connector.

11. The cable splicing assembly of claim 10 wherein each of said stud shafts is threadedly connected to its associated spacer block under a torque of approximately 5 foot pounds.

12. The cable splicing assembly of claim 10 including an adhesive sealant on said other threaded end portion of each stud shaft.

13. The cable splicing assembly of claim 9 including an adhesive sealant interposed between the contacting surfaces of said spacer blocks and their associated stud shafts.

14. The cable splicing assembly of claim 9 wherein said superimposed junction pads have recesses in their adjacent opposed surfaces, said recesses cooperating to define a gasket seal chamber, and said gasket seal being received and retained within said chamber.

* * * * *